US009513664B2

(12) United States Patent  
Werner et al.

(10) Patent No.: US 9,513,664 B2
(45) Date of Patent: *Dec. 6, 2016

(54) HOUSING FOR PORTABLE ELECTRONIC DEVICE WITH REDUCED BORDER REGION

(71) Applicant: Apple Inc., Cupertino, CA (US)

(72) Inventors: Christopher M. Werner, San Jose, CA (US); Emery A. Sanford, San Francisco, CA (US); Stephen Brian Lynch, Portola Valley, CA (US); Teodor Dabov, San Francisco, CA (US); Fletcher R. Rothkopf, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/801,550

(22) Filed: Jul. 16, 2015

(65) Prior Publication Data

US 2015/0323962 A1 Nov. 12, 2015

Related U.S. Application Data

(63) Continuation of application No. 13/246,697, filed on Sep. 27, 2011, now Pat. No. 9,128,666.

(Continued)

(51) Int. Cl.
*G06F 1/16* (2006.01)
*G06F 3/041* (2006.01)
*H04M 1/02* (2006.01)

(52) U.S. Cl.
CPC .......... *G06F 1/1626* (2013.01); *G06F 1/1637* (2013.01); *G06F 3/041* (2013.01); *H04M 1/0266* (2013.01);

(Continued)

(58) Field of Classification Search
CPC ... G06F 1/1626; G06F 1/1637; H04M 1/0266; Y10T 29/49002

(Continued)

(56) References Cited

U.S. PATENT DOCUMENTS

| 2,643,020 A | 6/1953 | Dalton |
| 3,415,637 A | 12/1968 | Glynn |

(Continued)

FOREIGN PATENT DOCUMENTS

| AT | 283 630 B | 10/1970 |
| CN | 1277090 A | 12/2000 |

(Continued)

OTHER PUBLICATIONS

Chemically Strengthened Glass, Wikipedia, Apr. 19, 2009, http://en/wikipedia.org/w/index.php?title=Chemically_strengthened_glass&oldid=284794988.

(Continued)

*Primary Examiner* — Forrest M Phillips
(74) *Attorney, Agent, or Firm* — Brownstein Hyatt Farber Schreck, LLP

(57) ABSTRACT

An electronic device having a housing structure that is configured to receive at least one glass cover is disclosed. The glass cover serves to cover a display assembly provided within the electronic device. The glass cover can be secured to the housing structure so as to facilitate providing a narrow border between an active display area and an outer edge of the housing structure. The enclosure for the electronic device can be thin yet be sufficiently strong to be suitable for use in electronic devices, such as portable electronic devices.

25 Claims, 8 Drawing Sheets

Related U.S. Application Data

(60) Provisional application No. 61/482,513, filed on May 4, 2011.

(52) U.S. Cl.
CPC ..... *Y10T 29/49002* (2015.01); *Y10T 29/49004* (2015.01)

(58) Field of Classification Search
USPC ........................................................ 361/810
See application file for complete search history.

(56) References Cited

U.S. PATENT DOCUMENTS

| | | |
|---|---|---|
| 3,441,398 A | 4/1969 | Hess |
| 3,467,508 A | 9/1969 | Loukes et al. |
| 3,498,773 A | 3/1970 | Due et al. |
| 3,558,415 A | 1/1971 | Rieser et al. |
| 3,607,172 A | 9/1971 | Poole et al. |
| 3,619,240 A | 11/1971 | Toussaint et al. |
| 3,626,723 A | 12/1971 | Plumat |
| 3,652,244 A | 3/1972 | Plumat |
| 3,753,840 A | 8/1973 | Plumat |
| 3,798,013 A | 3/1974 | Hasegawa et al. |
| 3,843,472 A | 10/1974 | Toussaint et al. |
| 3,857,689 A | 12/1974 | Koizumi et al. |
| 3,926,605 A | 12/1975 | Kunkle |
| 3,951,707 A | 4/1976 | Kurtz et al. |
| 4,015,045 A | 3/1977 | Rinehart |
| 4,052,184 A | 10/1977 | Anderson |
| 4,119,760 A | 10/1978 | Rinehart |
| 4,156,755 A | 5/1979 | Rinehart |
| 4,165,228 A | 8/1979 | Ebata et al. |
| 4,178,082 A | 12/1979 | Ganswein et al. |
| 4,212,919 A | 7/1980 | Hoda |
| 4,218,230 A | 8/1980 | Hogan |
| 4,346,601 A | 8/1982 | France |
| 4,353,649 A | 10/1982 | Kishii |
| 4,425,810 A | 1/1984 | Simon et al. |
| 4,537,820 A | 8/1985 | Nowobliski et al. |
| 4,646,722 A | 3/1987 | Silverstein et al. |
| 4,733,973 A | 3/1988 | Machak et al. |
| 4,842,629 A | 6/1989 | Clemens et al. |
| 4,844,724 A | 7/1989 | Sakai et al. |
| 4,846,868 A | 7/1989 | Aratani |
| 4,849,002 A | 7/1989 | Rapp |
| 4,872,896 A | 10/1989 | LaCourse et al. |
| 4,911,743 A | 3/1990 | Bagby |
| 4,937,129 A | 6/1990 | Yamazaki |
| 4,957,364 A | 9/1990 | Chesler |
| 4,959,548 A | 9/1990 | Kupperman et al. |
| 4,983,197 A | 1/1991 | Froning et al. |
| 4,986,130 A | 1/1991 | Engelhaupt et al. |
| 5,041,173 A | 8/1991 | Shikata et al. |
| 5,104,435 A | 4/1992 | Oikawa et al. |
| 5,129,934 A | 7/1992 | Koss |
| 5,157,746 A | 10/1992 | Tobita et al. |
| 5,160,523 A | 11/1992 | Honkanen et al. |
| 5,254,149 A | 10/1993 | Hashemi et al. |
| 5,269,888 A | 12/1993 | Morasca |
| 5,281,303 A | 1/1994 | Beguin et al. |
| 5,369,267 A | 11/1994 | Johnson et al. |
| 5,411,563 A | 5/1995 | Yeh |
| 5,437,193 A | 8/1995 | Schleitweiler et al. |
| 5,445,871 A | 8/1995 | Murase et al. |
| 5,483,261 A | 1/1996 | Yasutake |
| 5,488,204 A | 1/1996 | Mead et al. |
| 5,525,138 A | 6/1996 | Hashemi et al. |
| 5,625,154 A | 4/1997 | Matsuhiro et al. |
| 5,654,057 A | 8/1997 | Kitayama |
| 5,725,625 A | 3/1998 | Kitayama et al. |
| 5,733,622 A | 3/1998 | Starcke et al. |
| 5,766,493 A | 6/1998 | Shin |
| 5,780,371 A | 7/1998 | Rifqi et al. |
| 5,816,225 A | 10/1998 | Koch et al. |
| 5,825,352 A | 10/1998 | Bisset et al. |
| 5,826,601 A | 10/1998 | Muraoka et al. |
| 5,835,079 A | 11/1998 | Shieh |
| 5,880,411 A | 3/1999 | Gillespie et al. |
| 5,930,047 A | 7/1999 | Gunz et al. |
| 5,953,094 A | 9/1999 | Matsuoka et al. |
| 5,985,014 A | 11/1999 | Ueda et al. |
| 6,050,870 A | 4/2000 | Suginoya et al. |
| 6,114,039 A | 9/2000 | Rifqui |
| 6,120,908 A | 9/2000 | Papanu et al. |
| 6,166,915 A | 12/2000 | Lake et al. |
| 6,188,391 B1 | 2/2001 | Seely et al. |
| 6,245,313 B1 | 6/2001 | Suzuki et al. |
| 6,287,674 B1 | 9/2001 | Verlinden et al. |
| 6,307,590 B1 | 10/2001 | Yoshida |
| 6,310,610 B1 | 10/2001 | Beaton et al. |
| 6,323,846 B1 | 11/2001 | Westerman et al. |
| 6,325,704 B1 | 12/2001 | Brown et al. |
| 6,327,011 B2 | 12/2001 | Kim |
| 6,350,664 B1 | 2/2002 | Haji et al. |
| 6,393,180 B1 | 5/2002 | Farries et al. |
| 6,429,840 B1 | 8/2002 | Sekiguchi |
| 6,437,867 B2 | 8/2002 | Zeylikovich et al. |
| 6,516,634 B1 | 2/2003 | Green et al. |
| 6,521,862 B1 | 2/2003 | Brannon |
| 6,621,542 B1 | 9/2003 | Aruga |
| 6,690,387 B2 | 2/2004 | Zimmerman et al. |
| 6,718,612 B2 | 4/2004 | Bajorek |
| 6,769,274 B2 | 8/2004 | Cho et al. |
| 6,772,610 B1 | 8/2004 | Albrand et al. |
| 6,810,688 B1 | 11/2004 | Duisit et al. |
| 6,936,741 B2 | 8/2005 | Munnig et al. |
| 6,955,971 B2 | 10/2005 | Ghyselen et al. |
| 6,996,324 B2 | 2/2006 | Hiraka et al. |
| 7,012,700 B2 | 3/2006 | De Groot et al. |
| 7,013,709 B2 | 3/2006 | Hajduk et al. |
| 7,015,894 B2 | 3/2006 | Morohoshi |
| 7,070,837 B2 | 7/2006 | Ross |
| 7,166,531 B1 | 1/2007 | van Den Hoek et al. |
| 7,184,064 B2 | 2/2007 | Zimmerman et al. |
| 7,461,564 B2 | 12/2008 | Glaesemann |
| 7,558,054 B1 | 7/2009 | Prest et al. |
| 7,626,807 B2 | 12/2009 | Hsu |
| 7,663,607 B2 | 2/2010 | Hotelling et al. |
| 7,810,355 B2 | 10/2010 | Feinstein et al. |
| 7,872,644 B2 | 1/2011 | Hong et al. |
| 7,918,019 B2 | 4/2011 | Chang et al. |
| 8,013,834 B2 | 9/2011 | Kim |
| 8,110,268 B2 | 2/2012 | Hegemier et al. |
| 8,111,248 B2 | 2/2012 | Lee et al. |
| 8,312,743 B2 | 11/2012 | Pun et al. |
| 8,391,010 B2 | 3/2013 | Rothkopf |
| 8,393,175 B2 | 3/2013 | Kohli et al. |
| 8,551,283 B2 | 10/2013 | Pakula et al. |
| 8,673,163 B2 | 3/2014 | Zhong |
| 8,684,613 B2 | 4/2014 | Weber et al. |
| 8,824,140 B2 | 9/2014 | Prest |
| 9,128,666 B2 * | 9/2015 | Werner ................. G06F 1/1626 |
| 2002/0035853 A1 | 3/2002 | Brown et al. |
| 2002/0105793 A1 | 8/2002 | Oda |
| 2002/0155302 A1 | 10/2002 | Smith et al. |
| 2002/0157199 A1 | 10/2002 | Piltingsrud |
| 2003/0024274 A1 | 2/2003 | Cho et al. |
| 2003/0057183 A1 | 3/2003 | Cho et al. |
| 2003/0077453 A1 | 4/2003 | Oaku et al. |
| 2003/0234771 A1 | 12/2003 | Mulligan et al. |
| 2004/0051944 A1 | 3/2004 | Stark |
| 2004/0119701 A1 | 6/2004 | Mulligan et al. |
| 2004/0137828 A1 | 7/2004 | Takashashi et al. |
| 2004/0142118 A1 | 7/2004 | Takechi |
| 2004/0163414 A1 | 8/2004 | Eto et al. |
| 2005/0058423 A1 | 3/2005 | Brinkmann et al. |
| 2005/0105071 A1 | 5/2005 | Ishii |
| 2005/0135724 A1 | 6/2005 | Helvajian et al. |
| 2005/0174525 A1 | 8/2005 | Tsuboi |
| 2005/0193772 A1 | 9/2005 | Davidson et al. |
| 2005/0245165 A1 | 11/2005 | Harada et al. |
| 2005/0259438 A1 | 11/2005 | Mizutani |
| 2005/0285991 A1 | 12/2005 | Yamazaki |

(56) References Cited

U.S. PATENT DOCUMENTS

| | | |
|---|---|---|
| 2006/0026521 A1 | 2/2006 | Hotelling et al. |
| 2006/0055936 A1 | 3/2006 | Yun et al. |
| 2006/0063351 A1 | 3/2006 | Jain |
| 2006/0070694 A1 | 4/2006 | Rehfeld et al. |
| 2006/0097991 A1 | 5/2006 | Hotelling et al. |
| 2006/0197753 A1 | 9/2006 | Hotelling et al. |
| 2006/0227331 A1 | 10/2006 | Wollmer et al. |
| 2006/0238695 A1 | 10/2006 | Miyamoto |
| 2006/0250559 A1 | 11/2006 | Bocko et al. |
| 2006/0268528 A1 | 11/2006 | Zadeksky et al. |
| 2006/0292822 A1 | 12/2006 | Xie |
| 2007/0003796 A1 | 1/2007 | Isono et al. |
| 2007/0013822 A1 | 1/2007 | Kawata et al. |
| 2007/0029519 A1 | 2/2007 | Kikuyama et al. |
| 2007/0030436 A1 | 2/2007 | Sasabayashi |
| 2007/0039353 A1 | 2/2007 | Kamiya |
| 2007/0046200 A1 | 3/2007 | Fu et al. |
| 2007/0063876 A1 | 3/2007 | Wong |
| 2007/0089827 A1 | 4/2007 | Funatsu |
| 2007/0122542 A1 | 5/2007 | Halsey et al. |
| 2007/0132737 A1 | 6/2007 | Mulligan et al. |
| 2007/0196578 A1 | 8/2007 | Karp et al. |
| 2007/0236618 A1 | 10/2007 | Magg et al. |
| 2008/0020919 A1 | 1/2008 | Murata |
| 2008/0026260 A1 | 1/2008 | Kawai |
| 2008/0074028 A1 | 3/2008 | Ozolins et al. |
| 2008/0094716 A1 | 4/2008 | Ushiro et al. |
| 2008/0135175 A1 | 6/2008 | Higuchi |
| 2008/0158181 A1 | 7/2008 | Hamblin et al. |
| 2008/0202167 A1 | 8/2008 | Cavallaro et al. |
| 2008/0230177 A1 | 9/2008 | Crouser et al. |
| 2008/0243321 A1 | 10/2008 | Walser et al. |
| 2008/0261057 A1 | 10/2008 | Slobodin |
| 2008/0264176 A1 | 10/2008 | Bertrand et al. |
| 2008/0286548 A1 | 11/2008 | Ellison et al. |
| 2009/0046240 A1 | 2/2009 | Bolton |
| 2009/0067141 A1 | 3/2009 | Dabov et al. |
| 2009/0091551 A1 | 4/2009 | Hotelling et al. |
| 2009/0096937 A1 | 4/2009 | Bauer et al. |
| 2009/0153729 A1 | 6/2009 | Hiltunen et al. |
| 2009/0162703 A1 | 6/2009 | Kawai |
| 2009/0197048 A1 | 8/2009 | Amin et al. |
| 2009/0202808 A1 | 8/2009 | Glaesemann et al. |
| 2009/0220761 A1 | 9/2009 | Dejneka et al. |
| 2009/0257189 A1 | 10/2009 | Wang et al. |
| 2009/0294420 A1 | 12/2009 | Abramov et al. |
| 2009/0324899 A1 | 12/2009 | Feinstein et al. |
| 2009/0324939 A1 | 12/2009 | Feinstein et al. |
| 2010/0009154 A1 | 1/2010 | Allan et al. |
| 2010/0024484 A1 | 2/2010 | Kashima |
| 2010/0028607 A1 | 2/2010 | Lee et al. |
| 2010/0035038 A1 | 2/2010 | Barefoot et al. |
| 2010/0053632 A1 | 3/2010 | Alphonse et al. |
| 2010/0062284 A1 | 3/2010 | Watanabe et al. |
| 2010/0119846 A1 | 5/2010 | Sawada |
| 2010/0137031 A1 | 6/2010 | Griffin et al. |
| 2010/0154992 A1 | 6/2010 | Feinstein et al. |
| 2010/0167059 A1 | 7/2010 | Hashimoto et al. |
| 2010/0171920 A1 | 7/2010 | Nishiyama |
| 2010/0179044 A1 | 7/2010 | Sellier et al. |
| 2010/0206008 A1 | 8/2010 | Harvey et al. |
| 2010/0215862 A1 | 8/2010 | Gomez et al. |
| 2010/0216514 A1 | 8/2010 | Smoyer et al. |
| 2010/0224767 A1 | 9/2010 | Kawano et al. |
| 2010/0265188 A1 | 10/2010 | Chang et al. |
| 2010/0279067 A1 | 11/2010 | Sabia et al. |
| 2010/0285275 A1 | 11/2010 | Baca et al. |
| 2010/0296027 A1 | 11/2010 | Matsuhira et al. |
| 2010/0315570 A1 | 12/2010 | Mathew et al. |
| 2010/0321305 A1* | 12/2010 | Chang .................. G06F 3/0412 345/173 |
| 2011/0003619 A1 | 1/2011 | Fujii |
| 2011/0012873 A1 | 1/2011 | Prest et al. |
| 2011/0019123 A1 | 1/2011 | Prest et al. |
| 2011/0019354 A1 | 1/2011 | Prest et al. |
| 2011/0030209 A1 | 2/2011 | Chang et al. |
| 2011/0050657 A1 | 3/2011 | Yamada |
| 2011/0063550 A1 | 3/2011 | Gettemy et al. |
| 2011/0067447 A1 | 3/2011 | Prest et al. |
| 2011/0072856 A1 | 3/2011 | Davidson et al. |
| 2011/0102346 A1* | 5/2011 | Orsley .................. G06F 3/044 345/173 |
| 2011/0159321 A1 | 6/2011 | Eda et al. |
| 2011/0164372 A1* | 7/2011 | McClure ............... G06F 1/1613 361/679.26 |
| 2011/0182084 A1 | 7/2011 | Tomlinson |
| 2011/0186345 A1* | 8/2011 | Pakula .................. G06F 1/1626 174/520 |
| 2011/0188846 A1 | 8/2011 | Sorg |
| 2011/0199687 A1 | 8/2011 | Sellier et al. |
| 2011/0248152 A1 | 10/2011 | Svajda et al. |
| 2011/0255000 A1 | 10/2011 | Weber et al. |
| 2011/0255250 A1 | 10/2011 | Dinh |
| 2011/0267833 A1 | 11/2011 | Verrat-Debailleul et al. |
| 2011/0279383 A1 | 11/2011 | Wilson et al. |
| 2011/0300908 A1 | 12/2011 | Grespan et al. |
| 2012/0018323 A1* | 1/2012 | Johnson ............... H04B 1/3888 206/320 |
| 2012/0027399 A1* | 2/2012 | Yeates .................. C03C 21/002 396/535 |
| 2012/0099113 A1 | 4/2012 | de Boer et al. |
| 2012/0105400 A1 | 5/2012 | Mathew et al. |
| 2012/0118628 A1* | 5/2012 | Pakula .................. G06F 1/1626 174/520 |
| 2012/0135195 A1* | 5/2012 | Glaesemann ........ B23K 26/073 428/156 |
| 2012/0136259 A1 | 5/2012 | Milner et al. |
| 2012/0151760 A1 | 6/2012 | Steijner |
| 2012/0188743 A1* | 7/2012 | Wilson .................. G06F 3/041 361/816 |
| 2012/0196071 A1 | 8/2012 | Cornejo et al. |
| 2012/0202040 A1 | 8/2012 | Barefoot et al. |
| 2012/0236477 A1* | 9/2012 | Weber .................. C03C 21/003 361/679.01 |
| 2012/0236526 A1 | 9/2012 | Weber et al. |
| 2012/0281381 A1 | 11/2012 | Sanford |
| 2012/0328843 A1 | 12/2012 | Cleary et al. |
| 2013/0071601 A1 | 3/2013 | Bibl et al. |
| 2013/0083506 A1 | 4/2013 | Wright et al. |
| 2013/0182259 A1 | 7/2013 | Brezinski et al. |
| 2013/0213565 A1 | 8/2013 | Lee et al. |
| 2014/0176779 A1 | 6/2014 | Weber et al. |

FOREIGN PATENT DOCUMENTS

| | | |
|---|---|---|
| CN | 1369449 A | 9/2002 |
| CN | 1694589 A | 11/2005 |
| CN | 101025502 | 8/2007 |
| CN | 101206314 | 6/2008 |
| CN | 101523275 | 2/2009 |
| CN | 101465892 | 6/2009 |
| CN | 102117104 A | 7/2011 |
| CN | 102131357 | 7/2011 |
| CN | 101267509 | 8/2011 |
| CN | 1322339 A | 11/2011 |
| CN | 202799425 U | 3/2013 |
| CN | 103958423 A | 7/2014 |
| DE | 14 96 586 A1 | 6/1969 |
| DE | 17 71 268 A1 | 12/1971 |
| DE | 32 12 612 A1 | 10/1983 |
| DE | 103 22 350 A1 | 12/2004 |
| EP | 1038663 A2 | 9/2000 |
| EP | 1 206 422 B1 | 11/2002 |
| EP | 1 593 658 A1 | 11/2005 |
| EP | 1592073 | 11/2005 |
| EP | 2025556 A2 | 2/2009 |
| EP | 2036867 A1 | 3/2009 |
| EP | 2075237 | 7/2009 |
| EP | 2196870 A1 | 6/2010 |
| EP | 2233447 | 9/2010 |
| EP | 2483216 | 8/2012 |
| EP | 2635540 | 9/2013 |
| FR | 2 797 627 A1 | 2/2001 |

(56) References Cited

FOREIGN PATENT DOCUMENTS

| | | |
|---|---|---|
| FR | 2 801 302 A1 | 5/2001 |
| GB | 1 346 747 | 2/1974 |
| JP | B S42-011599 | 6/1963 |
| JP | B-S48-006925 | 9/1973 |
| JP | 55031944 | 3/1980 |
| JP | 55 067529 | 5/1980 |
| JP | 55-95645 | 7/1980 |
| JP | A S55-136979 | 10/1980 |
| JP | 55 144450 | 11/1980 |
| JP | A S59-013638 | 1/1984 |
| JP | 59037451 | 2/1984 |
| JP | A S61-097147 | 5/1986 |
| JP | 6066696 | 10/1986 |
| JP | 63 060129 | 3/1988 |
| JP | A S63-106617 | 5/1988 |
| JP | 63222234 | 9/1988 |
| JP | 5-32431 | 2/1993 |
| JP | 05249422 | 9/1993 |
| JP | 6242260 A | 9/1994 |
| JP | A H07-050144 | 2/1995 |
| JP | Hei 8-274054 | 10/1996 |
| JP | 52031757 | 3/1997 |
| JP | A-H09-073072 | 3/1997 |
| JP | A H09-507206 | 7/1997 |
| JP | 09-312245 | 12/1997 |
| JP | A H11-281501 | 10/1999 |
| JP | A 2000-086261 | 3/2000 |
| JP | 2000-163031 | 6/2000 |
| JP | 200203895 A | 7/2000 |
| JP | A 2001-083887 | 3/2001 |
| JP | A 2002-160932 | 6/2002 |
| JP | 2002-342033 | 11/2002 |
| JP | A 2002-338283 | 11/2002 |
| JP | A2003502257 | 1/2003 |
| JP | A2003-146705 | 5/2003 |
| JP | A 2004-094256 | 3/2004 |
| JP | A2004-259402 | 9/2004 |
| JP | A 2004-292247 | 10/2004 |
| JP | A2004-339019 | 12/2004 |
| JP | 2005-162549 | 6/2005 |
| JP | A 2005-156766 | 6/2005 |
| JP | A 2005140901 | 6/2005 |
| JP | 2005-353592 | 12/2005 |
| JP | A 2000-348338 | 12/2005 |
| JP | 2007-099557 | 4/2007 |
| JP | 2008-001590 | 1/2008 |
| JP | 2008007360 | 1/2008 |
| JP | 2008-63166 A | 3/2008 |
| JP | 2008-066126 A | 3/2008 |
| JP | 2008-192194 | 8/2008 |
| JP | A 2008-195602 | 8/2008 |
| JP | A 2008-216938 | 9/2008 |
| JP | A 2008-306149 | 12/2008 |
| JP | WO 2009/078406 | 6/2009 |
| JP | A 2009-167086 | 7/2009 |
| JP | A 2009-234856 | 10/2009 |
| JP | A2009230341 | 10/2009 |
| JP | 2010 064943 | 3/2010 |
| JP | A 2010-060908 | 3/2010 |
| JP | A 2010-116276 | 5/2010 |
| JP | U 3162733 | 8/2010 |
| JP | 2010/195600 | 9/2010 |
| JP | A 2010-237493 | 10/2010 |
| JP | 2011-032124 | 2/2011 |
| JP | A 2011-032140 | 2/2011 |
| JP | A 2011-158799 | 8/2011 |
| JP | 2011-527661 | 11/2011 |
| JP | A 2011-231009 | 11/2011 |
| JP | A 2013-537723 | 10/2013 |
| KR | 2010-2006-005920 | 1/2006 |
| KR | 10-2010-0019526 | 2/2010 |
| KR | 10-2011-0030919 | 3/2011 |
| TW | 201007521 A | 2/2010 |
| TW | 201235744 A1 | 9/2012 |
| WO | WO 00/47529 A | 8/2000 |
| WO | WO 02/42838 A1 | 5/2002 |
| WO | WO 2004/014109 | 2/2004 |
| WO | WO 2004-061806 | 7/2004 |
| WO | WO 2004/106253 A | 12/2004 |
| WO | WO 2007/089054 A1 | 8/2007 |
| WO | WO 2008/044694 A | 4/2008 |
| WO | WO 2008/143999 A1 | 11/2008 |
| WO | WO 2009/003029 | 12/2008 |
| WO | WO 2009/099615 | 8/2009 |
| WO | WO 2009/102326 | 8/2009 |
| WO | WO 2009125133 A2 | 10/2009 |
| WO | WO 2010/005578 | 1/2010 |
| WO | WO 2010/014163 | 2/2010 |
| WO | WO 2010/019829 A1 | 2/2010 |
| WO | WO 2010/080988 | 7/2010 |
| WO | WO 2010/101961 | 9/2010 |
| WO | WO 2011/008433 | 1/2011 |
| WO | WO 2010/027565 | 2/2011 |
| WO | WO 2011/041484 A1 | 4/2011 |
| WO | WO 2012/015960 | 2/2012 |
| WO | WO 2012/027220 A2 | 3/2012 |
| WO | WO 2012/106280 | 8/2012 |
| WO | WO 2013/106242 A2 | 7/2013 |

OTHER PUBLICATIONS

Wikipedia: "Iphone 4", www.wikipedia.org, retrieved Oct. 31, 2011, 15 pgs.
"Toward Making Smart Phone Touch-Screens More Glare and Smudge Resistant", e! Science News, http://eciencenews.com/articles/2009/08/19toward.making smart.phone.touch.screens.more.glare.and.smudge.resistant, Aug. 19, 2009, 1 pg.
Arun K. Varshneya, Chemical Strengthening of Glass: Lessons Learned and Yet to be Learned International Journal of Applied Glass Science, 2010, 1, 2, pp. 131-142.
Aben "Laboratory of Photoelasticity", Institute of Cybernetics at TTU, www.ioc.ee/res/photo.html, Oct. 5, 2000.
Forooghian et al., Investigative Ophthalmology & Visual Science; Oct. 2008, vol. 49, No. 10.
"iPhone 4", Wikipedia, Jan. 4, 2012, 17 pgs.
Mehrl et al., "Designer's Noticebook: Proximity Detection IR LED and Optical Crosstalk", http://ams.com/eng/content/view/download/145137, Aug. 1, 2011, 5 pages.
Saxer et al., "High-Speed Fiber-Based Polarization-sensitive optical coherence tomography of in vivo human skin", Optics Letters, vol. 25, No. 18, Sep. 15, 2000, pp. 1355-1357.
Ohkuma, "Development of a Manufacturing Process of a Thin, Lightweight LCD Cell", Department of Cell Process Development, IBM, Japan, Section 13.4, 2000.
Lee et al., "A Multi-Touch Three Dimensional Touch-Sensitive Tablet", Proceedings of CHI: ACM Conference on Human Factors in Computing Systems, Apr. 1985, pp. 21-25.
Rubine, "The Automatic Recognition of Gestures", CMU-CS-91-202, Submitted in Partial Fulfillment of the Requirements of the Degree of Doctor of Philosophy in Computer Science at Carnegie Mellon University, Dec. 1991, 285 pages.
Rubine, "Combining Gestures and Direct Manipulation", CHI'92, May 1992, pp. 659-660.
Westerman, "Hand Tracking, Finger Identification and Chronic Manipulation of a Multi-Touch Surface", A Dissertation Submitted to the Faculty of the University of Delaware in Partial Fulfillment of the Requirements for the degree of Doctor of Philosophy in Electrical Engineering, Spring 1999, 364 pages.
Karlsson et al., "The Technology of Chemical Glass Strengthening—a review", Apr. 2010, Glass Technology, European Journal of Glass Science and Technology A., vol. 51, No. 2, pp., 41-54.

\* cited by examiner

HOUSING FOR PORTABLE ELECTRONIC DEVICE WITH REDUCED BORDER REGION

CROSS-REFERENCE TO OTHER APPLICATIONS

This application is a continuation of U.S. patent application Ser. No. 13/246,697, Sep. 27, 2011, entitled "HOUSING FOR PORTABLE ELECTRONIC DEVICE WITH REDUCED BORDER REGION," which is herein incorporated by reference, and which in turn claims priority to U.S. Provisional Patent Application No. 61/482,513, filed May 4, 2011, entitled "HOUSING FOR PORTABLE ELECTRONIC DEVICE WITH REDUCED BORDER REGION," which is herein incorporated by reference.

BACKGROUND

Conventionally, a portable electronic device has a housing that encases the various electrical components of the portable electronic device. Often, the portable electronic device has a display arrangement that includes various layers. The various layers usually include at least a display technology layer, and may additionally include a sensing arrangement (e.g., touch sensors or touch screen) and/or a cover window disposed over the display technology layer. The cover window can be a plastic or glass cover that provides a protective outer surface that protects the display technology layer. The cover window can form part of an outer surface for the housing of the portable electronic device. Conventionally, supporting or securing the cover window to other portions of the housing tends to impede usage of a peripheral area of the cover window.

Nevertheless, as portable electronic device continue to be made smaller, thinner and/or more powerful, there remains a continuing need to provide improved techniques and structures for supporting cover windows of portable electronic device housings.

SUMMARY

The invention pertains to an electronic device having a housing structure that is configured to receive at least one glass cover. The glass cover serves to cover a display assembly provided within the electronic device. The glass cover can be secured to the housing structure so as to facilitate providing a narrow border between an active display area and an outer edge of the housing structure. The enclosure for the electronic device can be thin yet be sufficiently strong to be suitable for use in electronic devices, such as portable electronic devices.

The invention can be implemented in numerous ways, including as a method, system, device, or apparatus. Several embodiments of the invention are discussed below.

As a portable electronic device, one embodiment can, for example, include at least: an electronic device housing including a bottom surface and side surfaces; a glass cover for a top surface for the electronic device enclosure; at least one peripheral internal support structure secured to a peripheral region of a bottom surface of the glass cover, wherein the at least one peripheral internal support structure is within the periphery of the glass cover; a screen assembly having a top surface and a bottom surface, the top surface being secured to a central region of the bottom surface of the glass cover; and at least one surface support structure secured within the electronic device housing such that the at least one surface support structure is adjacent the bottom surface of the screen assembly.

As a method for assembling an electronic device, one embodiment can, for example, include at least: obtaining a glass member having a top surface and a bottom surface, the top surface providing an outer surface for substantially all of a surface of the electronic device; attaching at least one peripheral support structure to a peripheral region of the bottom surface of the glass member; attaching a screen assembly to a central region of the bottom surface of the glass member; attaching at least one surface support structure to the at least one peripheral support structure, wherein the glass member, the screen assembly and the at least one peripheral support structure form a resulting display assembly; and thereafter securing the resulting display assembly to a product housing using at least the peripheral support structure.

As a portable electronic device, one embodiment can, for example, include at least: an electronic device housing including a bottom surface and side surfaces; a glass cover for a top surface for the electronic device enclosure; at least one mounting bracket secured to a peripheral region of a bottom surface of the glass cover; a touch screen assembly having a top surface and a bottom surface, the top surface being secured to a central region of the bottom surface of the glass cover; and a frame secured within the electronic device housing such that the frame is adjacent the bottom surface of the touch screen assembly.

As a method for assembling an electronic device, one embodiment can, for example, include at least: obtaining a glass member having a top surface and a bottom surface, the top surface providing an outer surface for substantially all of a surface of the electronic device; attaching mounting brackets to a peripheral region of the bottom surface of the glass member; attaching a top surface of a screen assembly to a central region of the bottom surface of the glass member; attaching a frame adjacent a bottom surface of the screen assembly, wherein the glass member, the frame, the screen assembly and the mounting brackets forming a resulting display assembly; and thereafter securing the resulting display assembly to a product housing using the mounting brackets and/or frame.

As a portable electronic device, one embodiment can, for example, include at least: an electronic device housing including a bottom surface and side surfaces; a glass cover for a top surface for the electronic device enclosure; a frame secured to a peripheral region of a bottom surface of the glass cover; a screen assembly having a top surface and a bottom surface, the top surface being secured to a central region of the bottom surface of the glass cover; and at least one mounting bracket secured to the frame.

As a method for assembling an electronic device, one embodiment can, for example, include at least: obtaining a glass member having a top surface and a bottom surface, the top surface providing an outer surface for substantially all of a surface of the electronic device; attaching a frame to a peripheral region of the bottom surface of the glass member; attaching a screen assembly to a central region of the bottom surface of the glass member; attaching mounting brackets to the frame, wherein the glass member, the frame, the screen assembly and the mounting brackets forming a resulting display assembly; and thereafter securing the resulting display assembly to a product housing using the mounting brackets and/or frame.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

Figure 1:
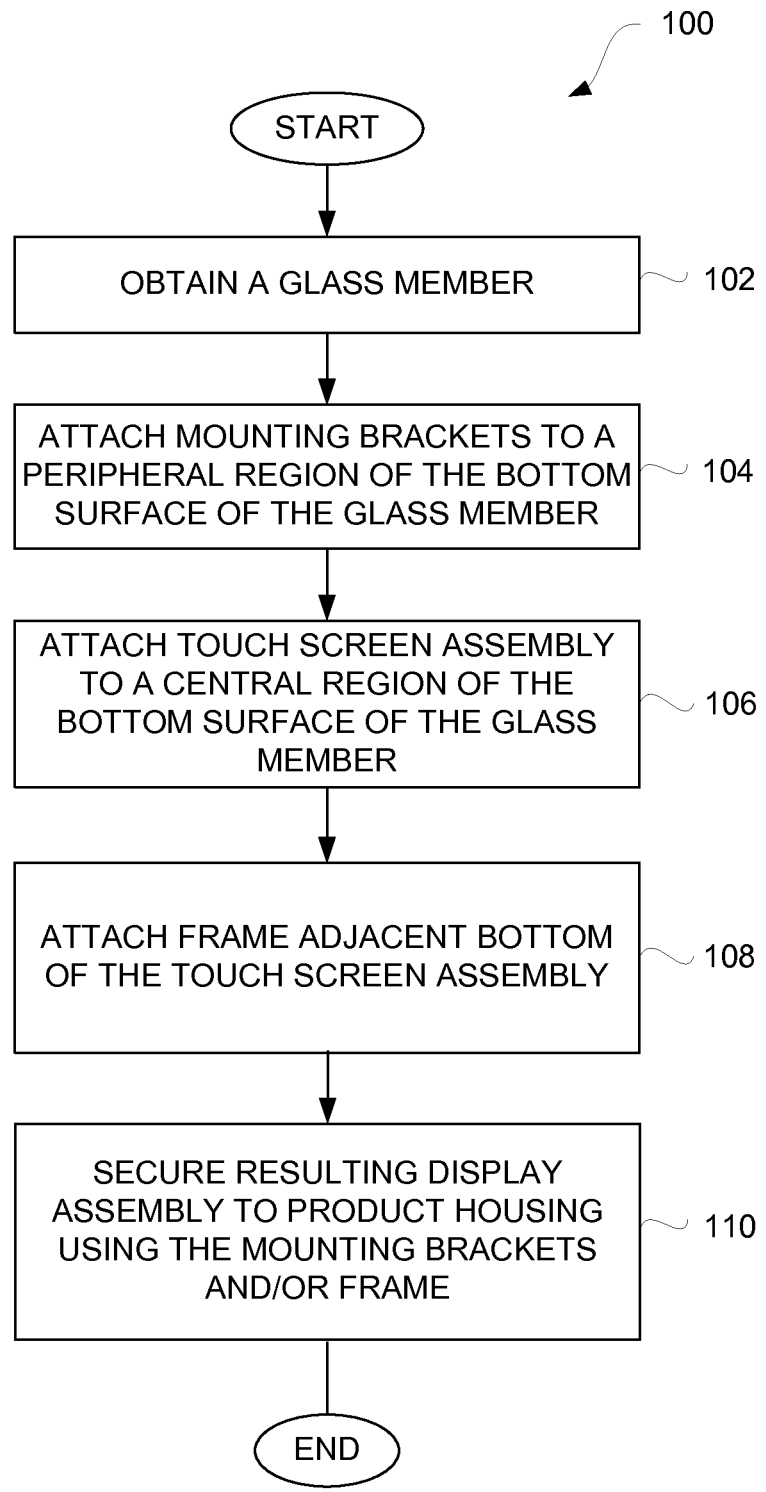
FIG. 1 a flow diagram of a housing formation process according to one embodiment.

Embodiments are described herein in the context of a housing for an electronic device. The housing can make use of an outer member, which can be formed of glass. The outer member can be aligned, protected and/or secured with respect to other portions of the housing for the electronic device. The electronic device can be portable and in some cases handheld.

According to one aspect, the invention pertains to an electronic device having a housing structure that is configured to receive at least one glass cover. The glass cover serves to cover a display assembly provided within the electronic device. The glass cover can be secured to the housing structure so as to facilitate providing a narrow border between an active display area and an outer edge of the housing structure. The enclosure for the electronic device can be thin yet be sufficiently strong to be suitable for use in electronic devices, such as portable electronic devices.

The following detailed description is illustrative only, and is not intended to be in any way limiting. Other embodiments will readily suggest themselves to skilled persons having the benefit of this disclosure. Reference will now be made in detail to implementations as illustrated in the accompanying drawings. The same reference indicators will generally be used throughout the drawings and the following detailed description to refer to the same or like parts. It should be appreciated that the drawings are generally not drawn to scale, and at least some features of the drawings have been exaggerated for ease of illustration.

Embodiments of the invention can relate to apparatus, systems and methods for forming a housing having a thin glass member for an electronic device. In one example, the glass member may be an outer surface of an electronic device. The glass member may for example correspond to a glass cover that helps form part of a display area of an electronic device (i.e., situated in front of a display either as a separate part or integrated within the display). Alternatively or additionally, the glass member may form a part of the housing. For example, it may form an outer surface other than in the display area.

The apparatus, systems and methods for improving strength of thin glass are especially suitable for glass covers, or displays (e.g., LCD displays), assembled in small form factor electronic devices such as handheld electronic devices (e.g., mobile phones, media players, personal digital assistants, remote controls, etc.). The glass can be thin in these small form factor embodiments, such as less than 3 mm, or more particularly between 0.5 and 2.5 mm, or even more particularly between 0.3 and 1.0 mm. The apparatus, systems and methods can also be used for glass covers or displays for other devices including, but not limited to including, relatively larger form factor electronic devices (e.g., portable computers, tablet computers, displays, monitors, televisions, etc.). The glass can also be thin in these larger form factor embodiments, such as less than 5 mm, or more particularly between 0.5 and 3 mm, or even more particularly between 0.3 and 2.0 mm.

Embodiments are discussed below with reference to FIGS. 1-7. However, those skilled in the art will readily appreciate that the detailed description given herein with respect to these figures is for explanatory purposes as the invention extends beyond these limited embodiments.

FIG. 1 a flow diagram of a housing formation process 100 according to one embodiment. The housing formation process 100 can operate to produce a housing for an electronic device, or at least a portion of such a housing.

The housing formation process 100 can initially obtain 102 a glass member. A top surface of the glass member can represent an outer surface for the housing, and the bottom surface of the glass member is an inner surface that is not exposed. The glass member can serve as a significant outer surface for the housing. For example, the glass member can correspond to a top surface for the housing. Alternatively or additionally, the glass member can correspond to a bottom surface for the housing. The glass member is typically thin, particularly when used with portable electronic devices. In one embodiment, the glass member has a thickness of less than 5 mm, or more particularly less than 1 mm.

After the glass member has been obtained 102, mounting brackets can be attached 104 to a peripheral region on the bottom surface of the glass member. The mounting brackets can be attached to the bottom surface of the glass member using an adhesive. The adhesive can, for example, by provided as a film or layer. Also, the manner by which the adhesive is deposited can vary. In one implementation, the adhesive can be deposited by forming a peripheral pattern of adhesive that can be placed on the bottom surface of the glass member so as to provide adhesive at the regions on the bottom surface of the glass member where the mounting brackets are to be placed. In another implementation, the adhesive can be screen printed on appropriate peripheral portions on the bottom surface of the glass member. In still another embodiment, the adhesive can be applied to the surface of the mounting brackets that is to be secured to the bottom surface of the glass member.

After the mounting brackets have been attached 104, a touch screen assembly can be attached 106 to a central region of the bottom surface of the glass member. The touch screen assembly can include a plurality of touch and display components that are laminated together to implement a touch screen. The touch and display components can, for example, include a display technology layer (e.g., LCD panel), a sensing layer (e.g., touch sensors) and/or a back light component.

The touch screen assembly can be attached 106 using an adhesive. The adhesive can, for example, by provided as film or layer. Also, the manner by which the adhesive is deposited can vary. In one implementation, the adhesive can be deposited by forming a pattern of adhesive (e.g., translucent adhesive) that can be placed on the bottom surface of the glass member so as to provide adhesive at the bottom surface of the glass member where the touch screen assembly is to be placed. The adhesive can additionally or alternatively be deposited on the top surface of the touch screen assembly. In another implementation, the adhesive can be screen printed or sprayed on appropriate portion of the bottom surface of the glass member and/or a top surface of the touch screen assembly.

Next, after the touch screen assembly has been attached 106, a frame can be attached 108 such that the frame is adjacent to the bottom surface of the touch screen assembly. The frame being attached 108 can serve to protect the touch screen assembly from damage and can provide structural stiffness to the housing for the electronic device. The frame can be attached 108 to the mounting members or side members of the housing for the electronic device. In one embodiment, the frame can be attached 108 using any of a variety of means, such as adhesive, screws, snaps or welds.

After the frame has been attached 108, the resulting display assembly, including the glass member, the mounting brackets, the touch screen assembly and the frame can be secured to the housing of the electronic device. For example, the resulting display assembly can be secured 110 to the housing of the electronic device by way of the mounting brackets and/or the frame. Following the block 110, the housing formation process 100 can end.

Figure 2A:
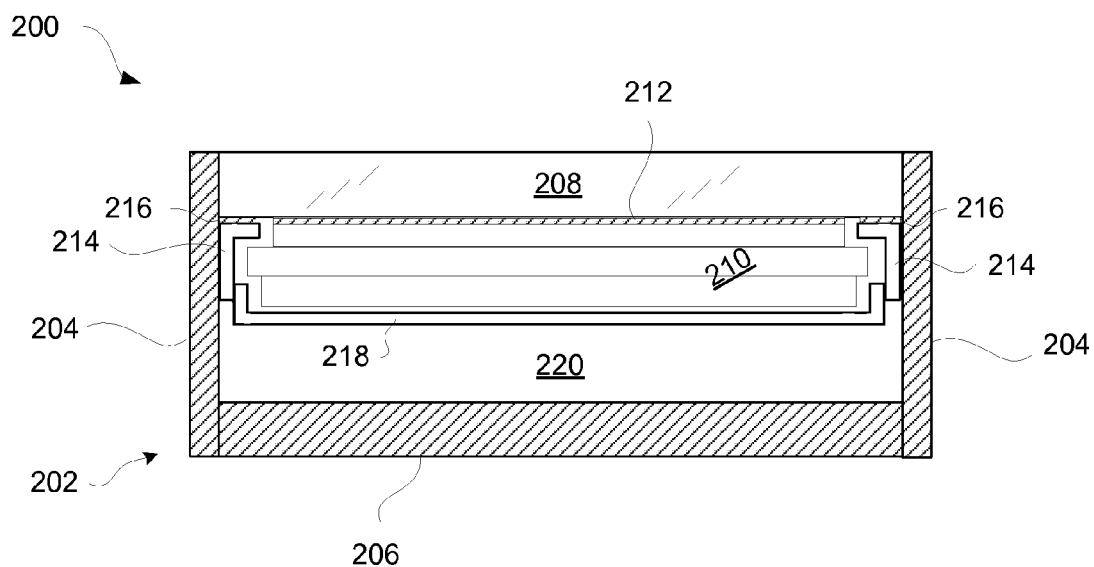
FIG. 2A is a cross-sectional view of an electronic device housing according to one embodiment.

FIG. 2A is a cross-sectional view of an electronic device housing 200 according to one embodiment. In one embodiment, the electronic device housing 200 can result from the housing formation process 100 illustrated in FIG. 1.

The electronic device housing 200 includes a housing 202. The housing 202 include side members 204 and a bottom member 206. A translucent member 208 can be provided as a top surface for the electronic device housing 200. For example, the translucent member 208 can be a glass member, often referred to as a cover glass, or a polymer-based member (e.g., plastic).

The electronic device housing 200 can include a touch screen assembly 210. The touch screen assembly 210 can include a plurality of touch and display components that are laminated together. The touch and display components can, for example, include a display technology layer (e.g., LCD panel), a sensing layer (e.g., touch sensors) and/or a backlight layer. The touch screen assembly 210 can be secured to a bottom surface of the translucent member 208 by a layer of adhesive 212.

Additionally, the electronic device housing 200 can include mounting brackets 214 that are secured to the peripheral portion of the bottom surface of the translucent member 208 with a layer of adhesive 216. The mounting brackets 214 can be formed of metal (e.g., aluminum, stainless steel) or a polymer. The mounting brackets 214 can be thin such as on the order of 0.1-0.6 mm. In one embodiment, the mounting brackets 214 can include a pair of rails secured to opposite sides of the peripheral portion of the bottom surface of the translucent member 208 with the layer of adhesive 216.

The electronic device housing 200 can also include a frame 218. The frame 218 is provided within the electronic device housing 200 and provided adjacent to a bottom surface of the touch screen assembly 210. In one embodiment, there is a small gap between the frame 218 and the bottom surface on the touch screen assembly 210. The frame 218 can serve to provide stiffness to the electronic device housing 200 and can also provide a surface that protects the touch screen assembly 210. The frame 218 can be secured to the mounting brackets 214 or the side members 204 by any of a variety of techniques (e.g., welding, screws, snaps, adhesive).

An internal space 220 is provided internal to the electronic device housing 200 whereby various electrical components (e.g., including processor, memory, battery and circuit board) can be attached, affixed or placed so as to provide electronic operations for the electronic device.

In general, the various members, parts or assemblies of the electronic device housing 200 can be formed of any of a variety of materials, e.g., glass, polymers or metal. In one embodiment, the translucent member 208 is glass, the mounting brackets 214 and the frame 218 are formed from metal or polymer (e.g., plastic), and the housing 202 is formed from glass, polymer (e.g., plastic) or metal.

FIGS. 2B-2E are a cross-sectional assembly diagrams for the electronic device housing 200 shown in FIG. 2A, according to one embodiment. The FIGS. 2A-2D represent a sequence of exemplary assembly steps to assembly the electronic device housing 200.

Figure 2B:
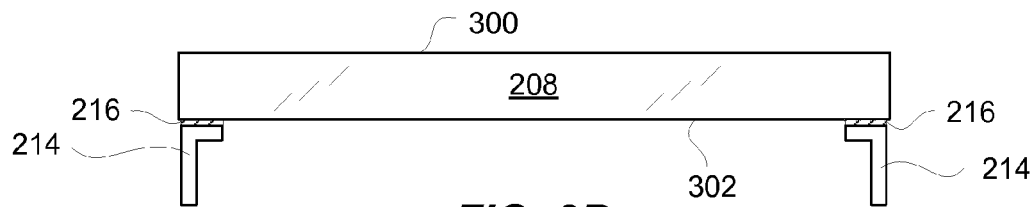
FIGS. 2B-2E are cross-sectional assembly diagrams for the electronic device housing shown in FIG. 2A, according to one embodiment.

In FIG. 2B, the translucent member 208 having a top surface 300 and a bottom surface 302 is provided. The bottom surface 302 of the translucent member 208 can have the adhesive 216 applied as a layer of adhesive at selected regions along certain sides of a periphery of the bottom surface 302 of the translucent member 208. The mounting brackets 214 can then be secured to the translucent member 208 via the adhesive 216.

Figure 2C:
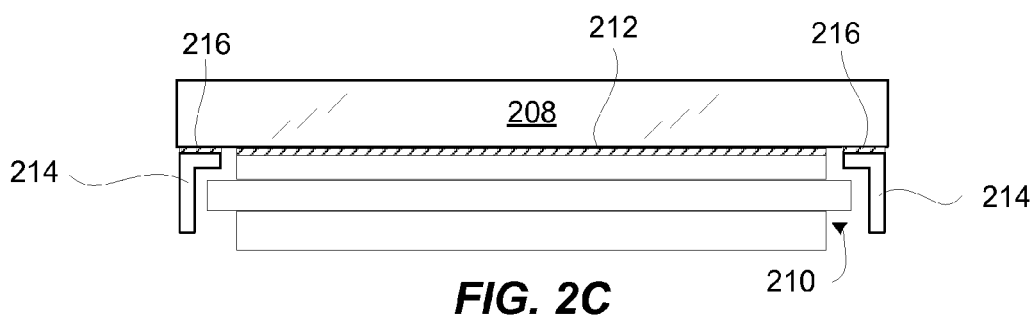

In FIG. 2C, the touch screen assembly 210 can then be secured to the translucent member 208 through use of the layer of adhesive 212. Typically, the layer of adhesive 212 would be translucent (e.g., clear). Here, the top surface of the touch screen assembly 210 is secured to the bottom surface 302 of the translucent member 208.

Figure 2D:
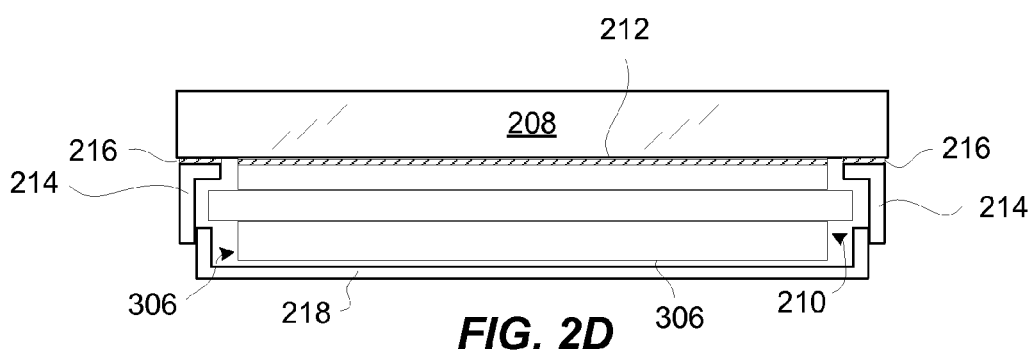

In FIG. 2D, the frame 218 can then be secured to the mounting brackets 214. The frame 218 can be secured to the mounting brackets 214 or the side members 304 through use of adhesive, welds, screws, etc. When attached, the frame 218 is adjacent a bottom surface 304 of the touch screen assembly 210. However, the frame 218 is typically not contacting the bottom surface 304 of the touch screen assembly 210. Instead, there is a small gap 306 between the frame 218 and the bottom surface 304 of the touch screen assembly 210.

Figure 2E:
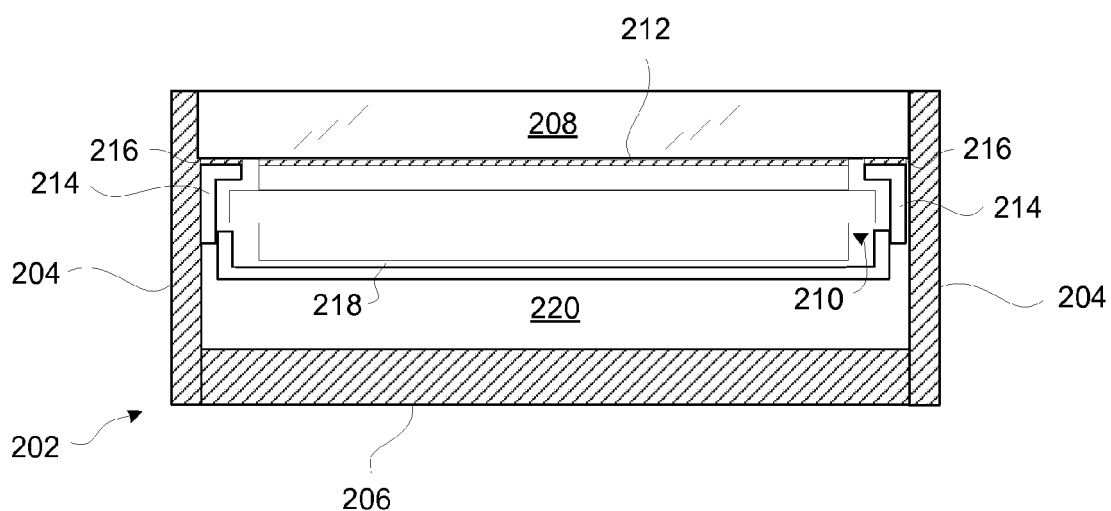

In FIG. 2E, the assembly resulting at FIG. 2D can then be inserted into the housing 202 for the electronic device. The assembly can be secured to the housing 202. For example, the assembly can be secured in place through use of adhesive, snaps, welds, screws, etc. In one embodiment, the mounting brackets 214 can be secured to side members 204 of the housing 202. Once the assembly resulting at FIG. 2D is inserted and then secured, the electronic device housing 200 as shown in FIG. 2A results.

Figure 3:
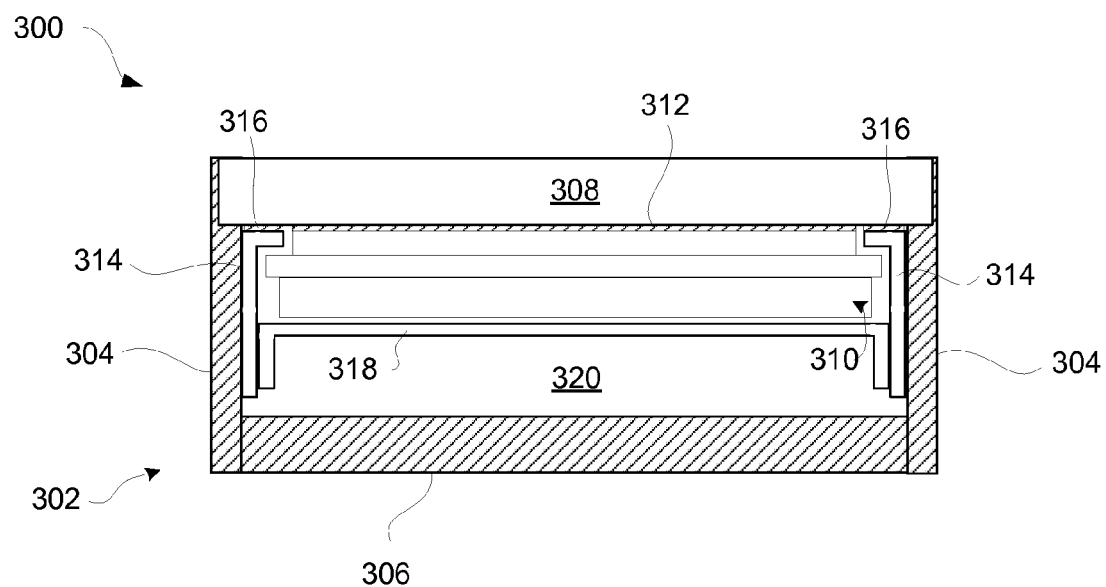
FIG. 3 is a cross-sectional view of an electronic device housing according to one embodiment.

FIG. 3 is a cross-sectional view of an electronic device housing 300 according to one embodiment. The electronic device housing 300 is generally similar to the electronic device housing 200 illustrated in FIG. 2A. The electronic device housing 300 includes a housing 302. The housing 302 include side members 304 and a bottom member 306. A translucent member 308 can be provided as a top surface for the electronic device housing 300. For example, the translucent member 308 can be a glass member, often referred to as a cover glass, or a polymer-based member (e.g., plastic).

The electronic device housing 300 can include a touch screen assembly 310. The touch screen assembly 310 can include a plurality of touch and display components that are laminated together. The touch and display components can, for example, include a display technology layer (e.g., LCD panel), a sensing layer (e.g., touch sensors) and/or a backlight layer. The touch screen assembly 310 can be secured to the a bottom surface of the translucent member 308 by a layer of adhesive 312.

Additionally, the electronic device housing 300 can include mounting brackets 314 that are secured to the peripheral portion of the bottom surface of the translucent member 308 with a layer of adhesive 316. The mounting brackets 314 can be formed of metal (e.g., aluminum, stainless steel) or a polymer. The mounting brackets 314 can be thin such as on the order of 0.1-0.6 mm. The configuration and placement of the mounting brackets 314 can be the same as the mounting brackets 214 used in FIG. 2A, except that the mounting brackets 314 can, in one embodiment, be longer (i.e., have greater height) than the mounting brackets 214. In one embodiment, the mounting brackets 314 can include a pair of rails secured to opposite sides of the peripheral portion of the bottom surface of the translucent member 308 with the layer of adhesive 316.

The electronic device housing 300 can also include a frame 318. The frame 318 is provided within the electronic device housing 300 and provided adjacent to a bottom surface of the touch screen assembly 310. In one embodiment, there is a small gap between the frame 318 and the bottom surface on the touch screen assembly 310. The frame 318 can serve to provide stiffness to the electronic device housing 300 and can also provide a surface that protects the touch screen assembly 310. The frame 318 can be secured to the mounting brackets 314 or the side members 304 by any of a variety of techniques (e.g., welding, screws, snaps, adhesive). The configuration and placement of the frame 318 can be the same as the frame 218 used in FIG. 2A, except that the frame 318 can be secured to the mounting brackets 314 at a lower position than used in FIG. 2A.

An internal space 320 is provided internal to the electronic device housing 300 whereby various electrical components (e.g., including processor, memory, battery and circuit board) can be attached, affixed or placed so as to provide electronic operations for the electronic device.

In general, the various members, parts or assemblies of the electronic device housing 300 can be formed of any of a variety of materials, e.g., glass, polymers or metal. In one embodiment, the translucent member 308 is glass, the mounting brackets 314 and the frame 318 are formed from metal or polymer (e.g., plastic), and the housing 302 is formed from glass, polymer (e.g., plastic) or metal.

Additionally, in one embodiment, such as shown in FIG. 3, a top portion of the mounting bracket 314 that is secured to the bottom surface of the translucent member 308 with the layer of adhesive 316 can slightly vertically overlap with a least one layer of the touch screen assembly 310. For example, FIG. 3 illustrates the top portion of the mounting bracket 314 that is secured to the bottom surface of the translucent member 308 with the layer of adhesive 316 being slightly overlapped (e.g., horizontally overlapped) with a middle layer of the touch screen assembly 300. The ability to overlap these components slightly in the horizontal direction provide for improved compact designs that are able to have even further reduced border thickness (between edge of active display area and edge of housing).

Figure 4A:
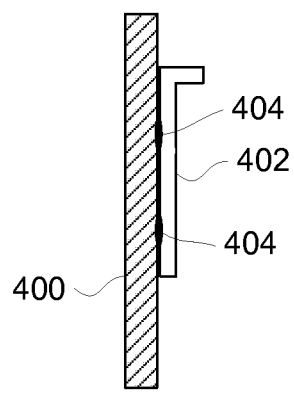
FIG. 4A illustrates a side member and a mounting bracket of an electronic device housing according to one embodiment.

FIG. 4A illustrates a side member 400 and a mounting bracket 402 of an electronic device housing according to one embodiment. The electronic device housing can, for example, pertain the electronic device housing 200 illustrated in FIG. 2A or the electronic device housing 300 illustrated in FIG. 3. In FIG. 4A, the mounting bracket 402 is attached to the side member 400 by welds 404.

Figure 4B:
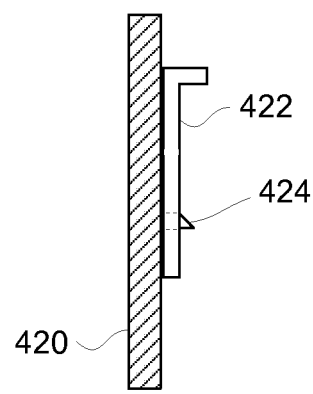
FIG. 4B illustrates a side member and a mounting bracket of an electronic device housing according to another embodiment.

FIG. 4B illustrates a side member 420 and a mounting bracket 422 of an electronic device housing according to one embodiment. The electronic device housing can, for example, pertain the electronic device housing 200 illustrated in FIG. 2A or the electronic device housing 300 illustrated in FIG. 3. In FIG. 4B, the mounting bracket 422 is attached to the side member 420 by at least one snap 424 which provides a mechanical retention therebetween.

Figure 4C:
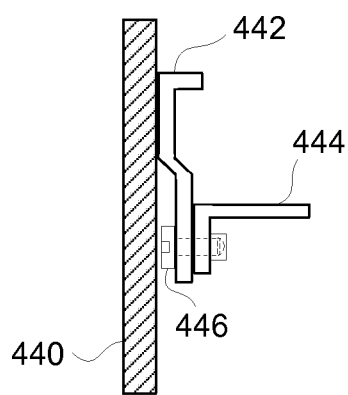
FIG. 4C illustrates a side member, a mounting bracket and a frame (portion thereof) of an electronic device housing according to one embodiment.
Figure 5:
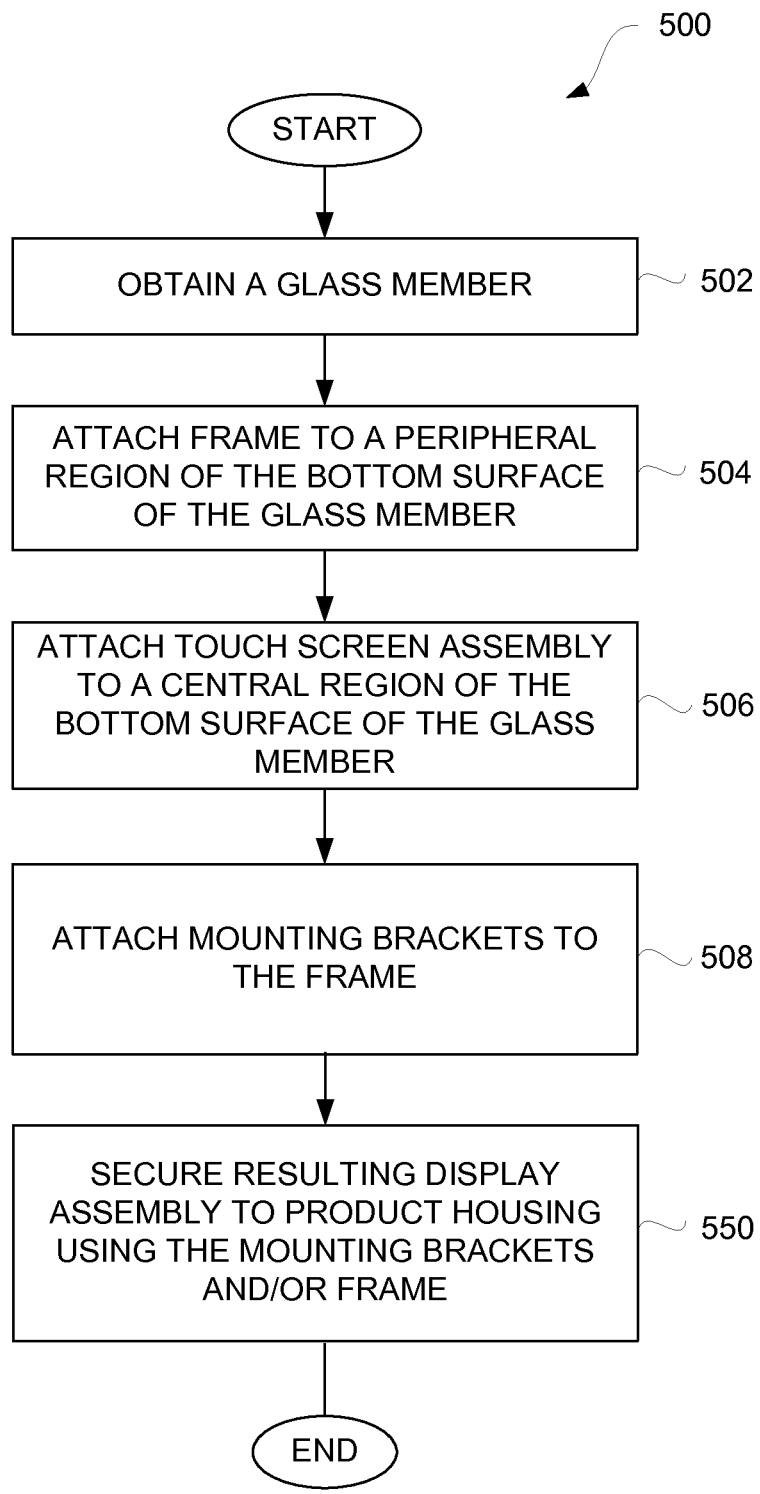
FIG. 5 a flow diagram of a housing formation process according to one embodiment.

FIG. 4C illustrates a side member 440, a mounting bracket 442 and a frame 444 (portion thereof) of an electronic device housing according to one embodiment. The electronic device housing can, for example, pertain the electronic device housing 200 illustrated in FIG. 2A or the electronic device housing 300 illustrated in FIG. 3. In FIG. 4C, the mounting bracket 442 is attached to the side member 440 by any of the above-noted techniques (e.g., adhesive, snap, screw, weld), and the frame 444 can be secured to the mounting bracket 442 by at least one screw 446 (or bolt). In an alternative embodiment, the screw 446 can further extend into or through the side member 440 to secure the mounting member 442 and the frame 444 to themselves and the side member 440.

In FIGS. 1-3 discussed above, the mounting bracket is secured to the bottom surface of a translucent member that can serve as a significant outer surface for a housing of an electronic device, such as a portable electronic device. However, in other embodiment, a frame or other structural component can instead be secured to the bottom surface of the translucent member FIG. 5 a flow diagram of a housing formation process 500 according to one embodiment. The housing formation process 500 can operate to produce a housing for an electronic device, or at least a portion of such a housing.

The housing formation process 500 can initially obtain 502 a glass member. A top surface of the glass member can represent an outer surface for the housing, and the bottom surface of the glass member is an inner surface that is not exposed. The glass member can serve as a significant outer surface for the housing. For example, the glass member can correspond to a top surface for the housing. Alternatively or additionally, the glass member can correspond to a bottom surface for the housing. The glass member is typically thin, particularly when used with portable electronic devices. In one embodiment, the glass member has a thickness of less than 5 mm, or more particularly less than 1 mm.

After the glass member has been obtained 502, a frame can be attached 504 to a peripheral region on the bottom surface of the glass member. The frame, once attached 504, can serve to protect the touch screen assembly from damage and can provide structural stiffness to the housing for the electronic device. When attached, the frame is adjacent to the bottom surface of the touch screen assembly. The frame can be attached to the bottom surface of the glass member using an adhesive. The adhesive can, for example, by provided as film or layer. Also, the manner by which the adhesive is deposited can vary. In one implementation, the adhesive can be deposited by forming a peripheral pattern of adhesive that can be placed on the bottom surface of the glass member so as to provide adhesive at the regions on the bottom surface of the glass member where the mounting brackets are to be placed. In another implementation, the adhesive can be screen printed on appropriate peripheral portions on the bottom surface of the glass member. In still another embodiment, the adhesive can be applied to the surface of the mounting brackets that is to be secured to the bottom surface of the glass member.

After the frame has been attached 504, a touch screen assembly can be attached 506 to a central region of the bottom surface of the glass member. The touch screen assembly can include a plurality of touch and display components that are laminated together to implement a touch screen. The touch and display components can, for example, include a display technology layer (e.g., LCD panel), a sensing layer (e.g., touch sensors) and/or a back light component.

The touch screen assembly can be attached 506 using an adhesive. The adhesive can, for example, by provided as film or layer. Also, the manner by which the adhesive is deposited can vary. In one implementation, the adhesive can be deposited by forming a pattern of adhesive (e.g., translucent adhesive) that can be placed on the bottom surface of the glass member so as to provide adhesive at the bottom surface of the glass member where the touch screen assembly is to be placed. The adhesive can additionally or alternatively be deposited on the top surface of the touch screen assembly. In another implementation, the adhesive can be screen printed or sprayed on appropriate portion of the bottom surface of the glass member and/or a top surface of the touch screen assembly.

Next, after the touch screen assembly has been attached 506, mounting brackets can be attached 508 to the frame. In one embodiment, the frame can be attached 508 to the frame using any of a variety of means, such as adhesive, screws, snaps or welds.

After the mounting brackets have been attached 508, the resulting display assembly, including the glass member, the mounting brackets, the touch screen assembly and the frame can be secured 550 to the housing of the electronic device. For example, the resulting display assembly can be secured to the housing of the electronic device by way of the mounting brackets and/or the frame. Following the block 550, the housing formation process 500 can end.

Figure 6:
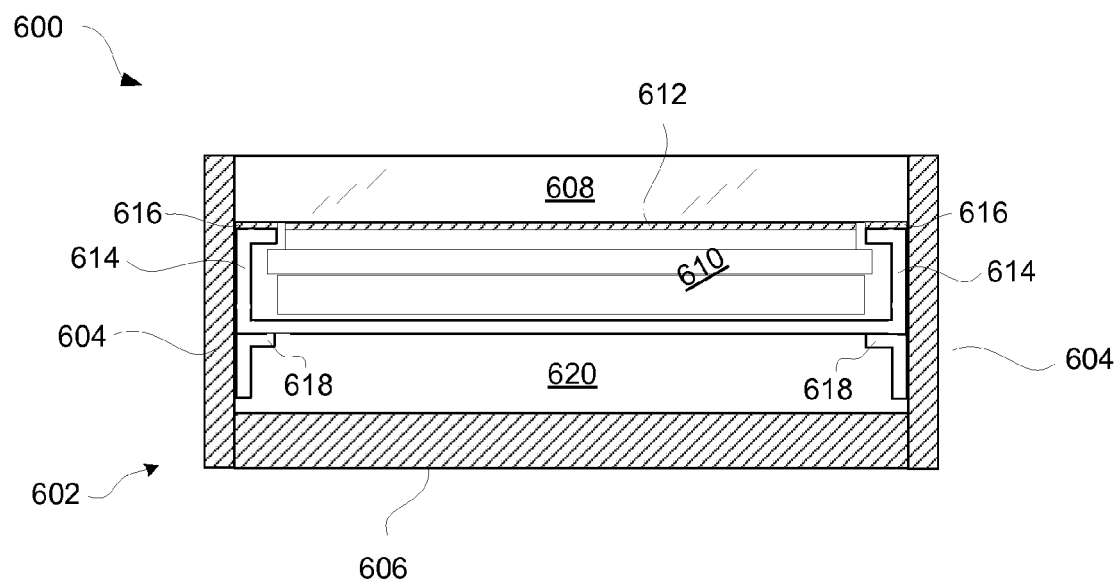
FIG. 6 is a cross-sectional view of an electronic device housing according to one embodiment.

FIG. 6 is a cross-sectional view of an electronic device housing 600 according to one embodiment. In one embodiment, the electronic device housing 600 can result from the housing formation process 500 illustrated in FIG. 5.

The electronic device housing 600 includes a housing 602. The housing 602 include side members 604 and a bottom member 606. A translucent member 608 can be provided as a top surface for the electronic device housing 600. For example, the translucent member 608 can be a glass member, often referred to as a cover glass, or a polymer-based member (e.g., plastic).

The electronic device housing 600 can include a touch screen assembly 610. The touch screen assembly 610 can include a plurality of touch and display components that are laminated together. The touch and display components can, for example, include a display technology layer (e.g., LCD panel), a sensing layer (e.g., touch sensors) and/or a back- light layer. The touch screen assembly 610 can be secured to a bottom surface of the translucent member 608 by a layer of adhesive 612.

Additionally, the electronic device housing 600 can include a frame 614 which can be secured to the peripheral portion of the bottom surface of the translucent member 608 with a layer of adhesive 616. The frame 614 is provided within the electronic device housing 600 and provided adjacent to a bottom surface of the touch screen assembly 610. In one embodiment, there is a small gap between the frame 614 and the bottom surface on the touch screen assembly 610. The frame 614 can serve to provide stiffness to the electronic device housing 600 and can also provide a surface that protects the touch screen assembly 610. Additionally, in one embodiment, a top portion of the frame 614 that is secured to the bottom surface of the translucent member 608 with the layer of adhesive 616 can slightly overlap (e.g., horizontally overlapped) with a least one layer of the touch screen assembly 610. For example, FIG. 6 illustrates the top portion of the frame 614 that is secured to the bottom surface of the translucent member 608 with the layer of adhesive 616 being slightly vertically overlapped with a middle layer of the touch screen assembly. The ability to overlap slightly in the horizontal direction provide for improved compact designs that are able to have even further reduced border thickness (between edge of active display area and edge of housing).

The electronic device housing 600 can include mounting brackets 618. The mounting brackets 618 can be secured to the side members 604. The mounting brackets 614 can be formed of metal (e.g., aluminum, stainless steel) or a polymer. The mounting brackets 614 can be thin such as on the order of 0.1-0.6 mm. The mounting brackets 618 can be secured to the frame 614 as well as to the side members 604 by any of a variety of techniques (e.g., welding, screws, snaps, adhesive).

An internal space 620 is provided internal to the electronic device housing 600 whereby various electrical components (e.g., including processor, memory, battery and circuit board) can be attached, affixed or placed so as to provide electronic operations for the electronic device.

In general, the various members, parts or assemblies of the electronic device housing 600 can be formed of any of a variety of materials, e.g., glass, polymers or metal. In one embodiment, the translucent member 608 is glass, the frame 614 and the mounting brackets 618 are formed from metal or polymer (e.g., plastic), and the housing 602 is formed from glass, polymer (e.g., plastic) or metal.

Figure 7:
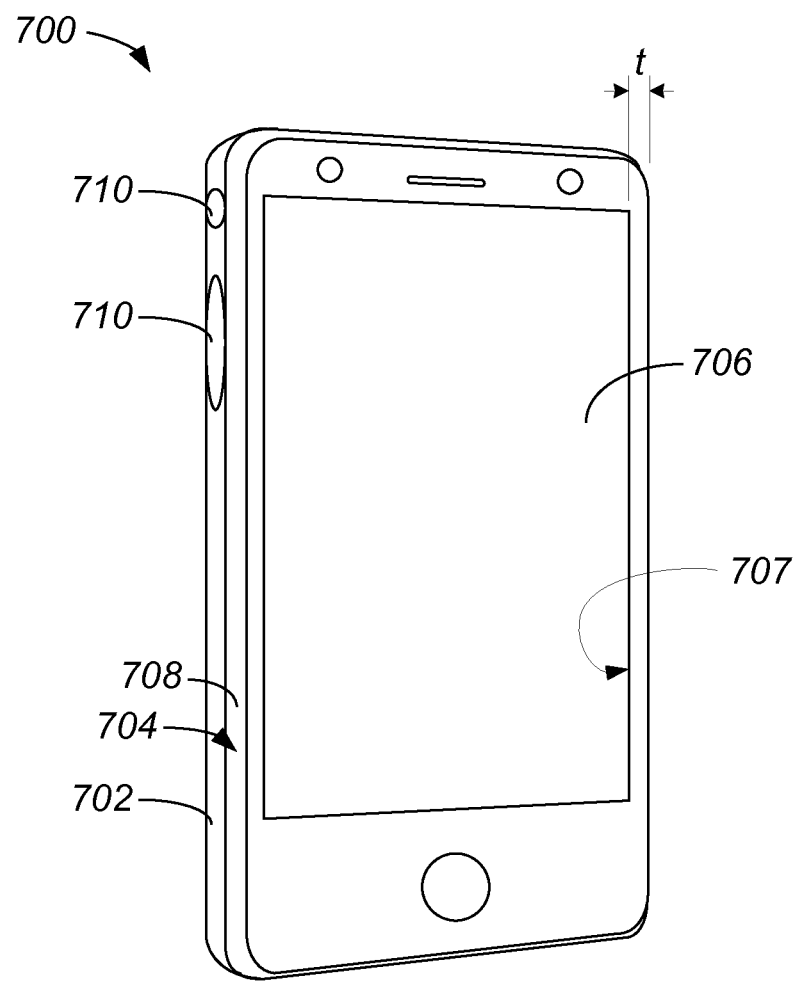
FIG. 7 is a perspective diagram of a handheld electronic device according to one embodiment.

FIG. 7 is a perspective diagram of a handheld electronic device 700 according to one embodiment. The handheld electronic device 700 may include a housing 702, e.g., a periphery member, that is arranged to at least partially surround the periphery of the handheld electronic device 700 to form some or all of the outer-most side, top and bottom surfaces of the handheld electronic device 700. The handheld electronic device 700 also includes a cover piece 704 that is arranged to be substantially coupled to housing 702 to effectively enclose an inner volume of the handheld electronic device 700. The cover piece 704 may include a glass member 706, e.g., cover glass provided over a display of the handheld electronic device 700. In one embodiment, the cover piece 704 includes a protective frame 708 in which glass member 706 is held. The glass member 706 can serve as the top surface of the housing 702. A display region 707 of the glass member 706 is that portion of the glass member 706 that corresponds to the display (e.g., active display region). Using the techniques described herein, the display can be secured to the housing 702 such that the active display region is able to nearly reach the edge of the housing. In other words, the border thickness (t) at the sides of the housing 702 is able to be reduced as compared to conventional designs. In one embodiment, the border thickness (t) can be 2 mm or less.

The housing 702 may have any suitable shape, including, for example, one or more elements that may be combined to form a rectangular structure. The housing 702 may at least partially enclose an inner volume in which electronic device components may be assembled and retained. The shape of housing 702 may substantially define boundaries of the inner volume, and may be determined based upon the size and type of components placed within the inner volume.

The housing 702 may have any suitable size, and the size may be determined based on any suitable criteria. Suitable criteria may include, but are not limited to including, aesthetics or industrial design, structural considerations, components required for a desired functionality, and/or product design. The housing 702 may have any suitable cross-section, including for example a variable cross-section or a constant cross-section. In some embodiments, the cross-section may be selected based on desired structural properties for housing 702. For example, the cross-section of housing 702 may be substantially rectangular, such that the height of housing 702 is substantially larger than the width of housing 702. Such a cross-sectional shape may provide structural stiffness in compression and tension, as well as in bending. In some embodiments, the dimensions of housing 702 cross-section may be determined relative to the dimensions of the components contained by housing 702.

In some embodiments, housing 702 may include features 710. The features 710 may generally include one or more openings, knobs, extensions, flanges, chamfers, or other features for receiving components or elements of the device. The features 710 of the housing 702 extend from any surface of housing 702, including for example from internal surfaces, e.g., to retain internal components or component layers, or from external surfaces. In particular, the housing 702 may include a slot or opening (not shown) for receiving a card or tray within the handheld electronic device 700. The housing 702 may also include a connector opening (not shown), e.g., for a 30-pin connector, through which a connector may engage one or more conductive pins of the handheld electronic device 700. Other features 710 included on the housing 702 may include, but are not limited to, an opening for providing audio to a user, an opening for receiving audio from a user, an opening for a connector (e.g., audio connector or power supply connector), and/or features for retaining and enabling a button such as a volume control or silencing switch.

Additional details on electronic device housings using insert molding for certain components are contained in: (i) U.S. application Ser. No. 12/895,822, filed Sep. 30, 2010, and entitled "Insert Molded Device Housings for Portable Electronic Devices," which is hereby incorporated herein by reference; and (ii) U.S. application Ser. No. 12/944,671, filed Nov. 11, 2010, and entitled "Insert Molding Around Glass Members for Portable Electronic Devices," which is hereby incorporated herein by reference.

Although mounting brackets and a frame for a display assembly are discussed above as separate components (which can facilitate assembly), it should be understood that the mounting brackets and frame are structural components that are used in an electronic device. In one embodiment, the mounting brackets and frame are integral. In another embodiment, the mounting brackets and frame are interchangeable.

Although various embodiments discussed herein include a touch screen assembly, various other embodiments may not include touch screen capabilities. In such other embodiments, a display assembly would be used in place of the touch screen assembly. The display assembly includes at least a display technology layer. The display assembly can also include a back light component.

In general, the steps associated with the methods of the present invention may vary widely. Steps may be added, removed, altered, combined, and reordered without departing from the spirit or the scope of the present invention.

The various aspects, features, embodiments or implementations of the invention described above may be used alone or in various combinations.

While this specification contains many specifics, these should not be construed as limitations on the scope of the disclosure or of what may be claimed, but rather as descriptions of features specific to particular embodiment of the disclosure. Certain features that are described in the context of separate embodiments may also be implemented in combination. Conversely, various features that are described in the context of a single embodiment may also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

While embodiments and applications have been shown and described, it would be apparent to those skilled in the art having the benefit of this disclosure that many more modifications than mentioned above are possible without departing from the inventive concepts herein.

What is claimed is:

1. A portable electronic device, comprising:
   an electronic device housing including a bottom surface and side surfaces;
   a glass cover for a top surface for the electronic device housing;
   a screen assembly having a top surface and a bottom surface, the top surface being secured to a central region of the bottom surface of the glass cover prior to securing the glass cover to the electronic device housing; and
   at least one mounting structure configured to secure to a peripheral region of a bottom surface of the glass cover to the electronic device housing.

2. A portable electronic device as recited in claim 1, wherein the mounting structure is secured to at least one of the side surfaces.

3. A portable electronic device as recited in claim 1, wherein the portable electronic device comprises:
   an internal support structure secured within the electronic device housing.

4. A portable electronic device as recited in claim 3,
   wherein the internal support structure is adjacent the bottom surface of the screen assembly after the glass cover is secured to the electronic device housing,
   wherein between the internal support structure and the bottom surface of the screen assembly is a separation gap, and
   wherein the separation gap is about 0.1-1.0 millimeters.

5. A portable electronic device as recited in claim 1, wherein the screen assembly is a touch screen assembly.

6. A portable electronic device as recited in claim 1, wherein at least a portion of the side surfaces is molded in place.

7. A portable electronic device as recited in claim 3,
wherein the internal support structure is secured to the at least one mounting structure, and
wherein the at least one mounting structure is secured to the peripheral region of the bottom surface of the glass cover using an adhesive.

8. A portable electronic device as recited in claim 7, wherein the at least one mounting structure comprises a pair of rails secured at opposite sides of the peripheral region of the bottom surface of the glass cover.

9. A portable electronic device as recited in claim 1, wherein the at least one mounting structure is secured to the electronic device housing and is configured to secure the glass cover and the screen assembly to the electronic device housing.

10. A portable electronic device as recited in claim 1, wherein thickness of the glass cover is about 0.3-1.0 mm.

11. A method for assembling an electronic device, the method comprising:
obtaining a glass member having a top surface and a bottom surface, the top surface providing an outer surface for substantially all of a surface of the electronic device;
attaching mounting brackets to a peripheral region of the bottom surface of the glass member;
attaching a top surface of a touch screen assembly to a central region of the bottom surface of the glass member, the glass member, the touch screen assembly and the mounting brackets forming a resulting display assembly; and
thereafter securing the resulting display assembly to a product housing using the mounting brackets.

12. A method as recited in claim 11, wherein the attaching of the mounting brackets comprises:
applying an adhesive to the peripheral region of the bottom surface of the glass member or the mounting brackets; and
pressing the mounting brackets against the adhesive at the peripheral region of the bottom surface of the glass member.

13. A method as recited in claim 11, wherein the attaching of the touch screen assembly comprises:
applying an adhesive to a top surface of the touch screen assembly or the bottom surface of the glass member; and
pressing the touch screen assembly to the bottom surface of the glass member via the adhesive.

14. A method as recited in claim 13, wherein the mounting brackets are metal.

15. A method as recited in claim 14, wherein the thickness of the mounting brackets is about 0.1-0.6 mm thick.

16. A method for assembling an electronic device, the method comprising:
obtaining a glass member having a top surface and a bottom surface, the top surface providing an outer surface for substantially all of a surface of the electronic device;
attaching a peripheral structure to a peripheral region of the bottom surface of the glass member;
attaching a screen assembly to a central region of the bottom surface of the glass member, wherein the glass member, the peripheral structure, the screen assembly forming a resulting display assembly; and
thereafter securing the resulting display assembly to a product housing using the peripheral structure.

17. A method as recited in claim 16, wherein the attaching of the peripheral structure comprises:
applying an adhesive to the peripheral region of the bottom surface of the glass member or a portion of the peripheral structure; and
pressing the peripheral structure against the adhesive at the peripheral region of the bottom surface of the glass member.

18. A method as recited in claim 16, wherein the attaching of the screen assembly comprises:
applying an adhesive to a top surface of the screen assembly or the bottom surface of the glass member; and
pressing the screen assembly to the bottom surface of the glass member via the adhesive.

19. A method as recited in claim 18, wherein the peripheral structure is metal.

20. A method as recited in claim 18, wherein the peripheral structure includes or couples to at least one mounting bracket.

21. A method as recited in claim 20,
wherein the thickness of the mounting brackets is about 0.1-0.6 mm thick, and
wherein the mounting brackets and the frame are formed from stainless steel.

22. A portable electronic device, comprising:
an electronic device housing including a bottom surface and side surfaces;
a glass cover for a top surface for the electronic device housing;
at least one peripheral internal support structure secured to a peripheral region of a bottom surface of the glass cover;
a screen assembly having a top surface and a bottom surface, the top surface being secured to a central region of the bottom surface of the glass cover; and
at least one surface support structure secured within the electronic device housing such that the at least one surface support structure is adjacent the bottom surface of the screen assembly.

23. A portable electronic device as recited in claim 22, wherein the at least one peripheral internal support structure and the at least one surface support structure are metal.

24. A portable electronic device as recited in claim 22, wherein the thickness of each of the at least one peripheral internal support structure and the at least one surface support structure is about 0.1-0.6 mm thick.

25. A portable electronic device as recited in claim 22, wherein the screen assembly is a touch screen assembly, and wherein the at least one surface support structure is secured to the at least one peripheral support structure or to at least one of the side surfaces.

* * * * *